(12) United States Patent
Peuhkurinen (10) Patent No.: US 11,568,616 B1
(45) Date of Patent: Jan. 31, 2023

(54) DISPLAY APPARATUSES AND METHODS FOR FACILITATING LOCATION-BASED VIRTUAL CONTENT

(71) Applicant: Varjo Technologies Oy, Helsinki (FI)

(72) Inventor: Ari Antti Erik Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/536,527

(22) Filed: Nov. 29, 2021

(51) Int. Cl.
*G06T 19/00* (2011.01)
*G06T 7/70* (2017.01)
*G06T 17/00* (2006.01)

(52) U.S. Cl.
CPC ............. *G06T 19/006* (2013.01); *G06T 7/70* (2017.01); *G06T 17/00* (2013.01); *G06T 2219/2016* (2013.01)

(58) Field of Classification Search
CPC ............................. G06T 17/00; G06T 19/006
See application file for complete search history.

(56) References Cited

U.S. PATENT DOCUMENTS

| 2003/0030666 | A1* | 2/2003 | Najmi | H04M 1/72445 |
| | | | | 715/745 |
| 2013/0083173 | A1* | 4/2013 | Geisner | G02B 27/017 |
| | | | | 348/51 |
| 2018/0033208 | A1* | 2/2018 | Martin | H04N 1/32128 |
| 2020/0137622 | A1* | 4/2020 | Vlachou | G06F 3/011 |
| 2021/0248827 | A1* | 8/2021 | Baier | G02B 27/017 |

* cited by examiner

*Primary Examiner* — Charles Tseng
(74) *Attorney, Agent, or Firm* — Ziegler IP Law Group, LLC (57) ABSTRACT

A display apparatus including: light source(s) per eye, first tracking means, and processor(s) configured to: process first tracking data, collected by first tracking means, to determine location of display apparatus in real-world environment; obtain software application(s) that is available for location of display apparatus along with metainformation indicative of location in real-world environment with which software application(s) is/are associated; determine relative location of display apparatus with respect to location with which software application(s) is/are associated; execute software application(s) to create and overlay virtual content on image(s) representing real-world environment, based on relative location of display apparatus with respect to location with which software application(s) is/are associated; and display image(s) via light source(s).

22 Claims, 4 Drawing Sheets

DISPLAY APPARATUSES AND METHODS FOR FACILITATING LOCATION-BASED VIRTUAL CONTENT

TECHNICAL FIELD

The present disclosure relates to display apparatuses for facilitating location-based virtual content. The present disclosure also relates to methods for facilitating location-based virtual content.

BACKGROUND

With recent developments in software technology, location-based services have gained popularity amongst users of devices. Generally, such services utilise location tracking technology, and information and communication technologies, to provide location-based experiences to the users, based on locations of the users. For example, location-based advertisements are provided to the users on their smartphones.

These location-based experiences are increasingly gaining popularity in fields of evolving technologies such as immersive extended-reality (XR) technologies (which are being employed in various fields such as entertainment, training, infotainment, navigation, and the like). As an example, a location-based experience in XR may involve provision of a virtual object at a specific location in a real-world environment. Typically, the location-based experiences are provided when location-based service applications are executed on trackable mobile devices associated with the users. Development of equipment and techniques for facilitating location-based services is ongoing and is important in order to raise the bar for improving user experience.

However, existing equipment and techniques for facilitating location-based services have several limitations associated therewith. The existing equipment and techniques are inefficient in terms of managing access of the location-based service applications as well as execution of the location-based service applications. As an example, when multiple location-based services are to be accessed via some specialized devices (such as XR display devices), all of these multiple location-based service applications are required to be stored and installed beforehand at such devices. This may not be always feasible (due to storage capacity limitations), is time-consuming and is highly inconvenient. Moreover, storing and installing all the multiple location-based service applications is often unnecessary, as the user may never go to some locations with which some of the multiple location-based service applications are associated.

Therefore, in light of the foregoing discussion, there exists a need to overcome the aforementioned drawbacks associated with existing equipment and techniques for facilitating location-based services.

SUMMARY

The present disclosure seeks to provide a display apparatus for facilitating location-based virtual content. The present disclosure also seeks to provide a method for facilitating location-based virtual content. An aim of the present disclosure is to provide a solution that overcomes at least partially the problems encountered in prior art.

In one aspect, an embodiment of the present disclosure provides a display apparatus comprising:
  at least one light source per eye;
  first tracking means; and
  at least one processor configured to:
    process first tracking data, collected by the first tracking means, to determine a location of the display apparatus in a real-world environment;
    obtain at least one software application that is available for the location of the display apparatus along with metainformation indicative of a location in the real-world environment with which the at least one software application is associated;
    determine a relative location of the display apparatus with respect to the location with which the at least one software application is associated;
    execute the at least one software application to create and overlay virtual content on at least one image representing the real-world environment, based on the relative location of the display apparatus with respect to the location with which the at least one software application is associated; and
    display the at least one image via the at least one light source.

In another aspect, an embodiment of the present disclosure provides a method comprising:
  processing first tracking data, collected by first tracking means, to determine a location of a display apparatus in a real-world environment;
  obtaining at least one software application that is available for the location of the display apparatus along with metainformation indicative of a location in the real-world environment with which the at least one software application is associated;
  determining a relative location of the display apparatus with respect to the location with which the at least one software application is associated;
  executing the at least one software application to create and overlay virtual content on at least one image representing the real-world environment, based on the relative location of the display apparatus with respect to the location with which the at least one software application is associated; and
  displaying the at least one image via at least one light source.

Embodiments of the present disclosure substantially eliminate or at least partially address the aforementioned problems in the prior art, and enable the display apparatus to provide realistic and immersive location-based virtual content on the at least one image in an efficient, accurate, and reliable manner, and in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 4A illustrates a plan view of an exemplary real-world environment in which a display apparatus is used, while

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:
- at least one light source per eye;
- first tracking means; and
- at least one processor configured to:
  - process first tracking data, collected by the first tracking means, to determine a location of the display apparatus in a real-world environment;
  - obtain at least one software application that is available for the location of the display apparatus along with metainformation indicative of a location in the real-world environment with which the at least one software application is associated;
  - determine a relative location of the display apparatus with respect to the location with which the at least one software application is associated;
  - execute the at least one software application to create and overlay virtual content on at least one image representing the real-world environment, based on the relative location of the display apparatus with respect to the location with which the at least one software application is associated; and
  - display the at least one image via the at least one light source.

In another aspect, an embodiment of the present disclosure provides a method comprising:
- processing first tracking data, collected by first tracking means, to determine a location of a display apparatus in a real-world environment;
- obtaining at least one software application that is available for the location of the display apparatus along with metainformation indicative of a location in the real-world environment with which the at least one software application is associated;
- determining a relative location of the display apparatus with respect to the location with which the at least one software application is associated;
- executing the at least one software application to create and overlay virtual content on at least one image representing the real-world environment, based on the relative location of the display apparatus with respect to the location with which the at least one software application is associated; and
- displaying the at least one image via at least one light source.

The present disclosure provides the aforementioned display apparatus and the aforementioned method for facilitating location-based virtual content. Herein, the at least one processor utilizes knowledge of the location of the display apparatus along with associations between software applications and locations in the real-world environment (with which the software applications are associated), to automatically obtain at least one requisite software application for execution, based on the location of the display apparatus. Thus, the at least one software application is not required to be pre-stored by the display apparatus prior to its execution. In this regard, the at least one software application is conveniently installed as and when required. Beneficially, this enables in executing the at least one software application that is relevant for the location of the display apparatus and in subsequently displaying the at least one image (upon creating and overlaying the virtual content on at least one image), in real time or near-real time (without any latency). Moreover, the relative location of the display apparatus (with respect to the location with which the at least one software application is associated) is beneficially utilized to ensure that upon the execution of the at least one software application, the virtual content is overlaid at a correct position in the at least one image. The at least one image so generated represents the virtual content in a realistic manner at the location associated with the at least one software application, thereby providing an immersive viewing experience to the user. The method is fast, effective, reliable and can be implemented and used easily.

Throughout the present disclosure, the term "display apparatus" refers to a specialized equipment that is capable of at least displaying images. These images are to be presented to a user of the display apparatus present in the real-world environment. Optionally, the display apparatus is implemented as a head-mounted display (HMD) device. The term "head-mounted display" refers to specialized equipment that is configured to present an XR environment to the user when said HMD device, in operation, is worn by the user on his/her head. The HMD device is to implemented, for example, as an XR headset, a pair of XR glasses, and the like, that is operable to display a visual scene of the XR environment to the user. The term "extended-reality" encompasses virtual reality (VR), augmented reality (AR), mixed reality (MR), and the like. It will be appreciated that the display apparatus obtains, executes, and displays the at least one image in real time or near-real time (without any latency).

Throughout the present disclosure, the term "light source" refers to an element from which light emanates. Optionally, the at least one light source is implemented as a display. In this regard, the at least one image is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, the at least one light source is implemented as a projector. In this regard, the at least one image is projected onto a projection screen or directly onto a retina of the user's eyes. Examples of such a projector include, but are not limited to, an LCD-based projector, an LED-based projector, an OLED-based projector, an LCoS-based projector, a Digital Light Processing (DLP)-based projector, and a laser projector. Optionally, the at least one light source is a single-resolution light source. Alternatively, optionally, the at least one light source is a multi-resolution light source.

Optionally, the at least one processor is communicably coupled to the at least one light source and a given tracking means wirelessly and/or in a wired manner. The at least one processor may be understood to implement at least a compositor (that is configured to perform at least the compositing tasks pertaining to generation of the at least one image upon creating and overlaying the virtual content on the at least one image). The compositor is a software module taking various inputs (such as the at least one image, the virtual content) and composing (namely, building or generating) an XR image to be displayed at the at least one light source. The at least one processor may be understood to implement an experience managing module. The compositor and the experience managing module may be served as a runtime layer of the display apparatus.

Throughout the present disclosure, the term "tracking means" refers to specialized equipment that is employed to detect and/or follow a location (namely, a position) and/or orientation of the display apparatus in the real-world environment. The given tracking means could be implemented as an inside-out tracking system, an outside-in tracking system, or as a combination thereof. Optionally, when the given tracking means is implemented as the inside-out tracking system, the at least one processor is configured to utilize a 3D model of the real-world environment to ascertain the location of the display apparatus. Optionally, the 3D model of the real-world environment is created by the at least one processor. Alternatively, optionally, the 3D model of the real-world environment is obtained by the at least one processor from a data repository, wherein the data repository is communicably coupled to the at least one processor. Such a data repository may be implemented as a memory of a device (such as the display apparatus, a computing device located externally from the display apparatus, or similar), a removable memory, a cloud-based database, or similar.

The given tracking means could be implemented as at least one of: an optics-based tracking system (which utilizes, for example, at least one of: infrared beacons and detectors, infrared cameras, visible-light cameras, detectable objects and detectors, or the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Navigation Satellite System (GNSS), a Global Positioning System (GPS) tracking system. As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader.

Optionally, the at least one processor employs at least one data processing algorithm to process a given tracking data, for determining the location and/or the orientation of the display apparatus in the real-world environment. A given tracking data may be in form of images, IMU/TIMU values, motion sensor data values, magnetic field strength values, or similar. Correspondingly, requisite data processing algorithm(s) is/are employed to process the given tracking data, to determine the location and/or orientation of the display apparatus. Examples of the at least one data processing algorithm include a feature detection algorithm, an environment mapping algorithm, a data extrapolation algorithm, and the like.

It will be appreciated that the given tracking data may be collected and processed dynamically (i.e., continuously, periodically (for example, after every second or after every two seconds), or intermittently (for example, after two seconds, and then again after 10 seconds, and so on). For example, a rate of collecting and processing the given tracking data is high, when the user is moving. In such a case, the given tracking data may be collected and processed, for example, at every second.

Optionally, the first tracking means is configured to track at least the location of the display apparatus. When the display apparatus is worn by the user on his/her head, at least the location of the display apparatus in the real-world environment changes as the user moves around the real-world environment. It will be appreciated that the location of the display apparatus could be a two-dimensional (2D) location or a three-dimensional (3D) location. In one case, when a height of the display apparatus is constant with respect to a fixed ground level or the height is not tracked, the location of the display apparatus may be determined as the 2D location. Such a case may occur when the first tracking means is implemented as the GPS tracking system, or as the GNSS. In other case, when a height of the display apparatus changes with respect to a fixed ground level, the location of the display apparatus may be determined as the 3D location. In this regard, the first tracking means is configured to only track translational movements of the display apparatus within the 3D space of the real-world environment. Such a case may occur when the first tracking means is implemented as the outside-in tracking system, or as the inside-out tracking system.

In an embodiment, the at least one processor is configured to determine the location of the display apparatus in a global coordinate system representing a 3D space of the real-world environment. Optionally, the global coordinate system has a predefined origin and three mutually perpendicular coordinate axes. The three mutually perpendicular coordinate axes could be, for example, X, Y, and Z axes. Optionally, in this regard, the 3D location of the display apparatus in the global coordinate system is expressed as (x, y, z) location coordinates along the X, Y and Z axes, respectively. Optionally, the 2D location of the display apparatus in the global coordinate system is expressed as (x, y) location coordinates along the X and Y, respectively. Optionally, the at least one processor employs the at least one data processing algorithm to process the first tracking data, for determining the location of the display apparatus in the real-world environment.

In an example, the user of the display apparatus may be present in a building (such as mall). The location of the display apparatus may be determined to ascertain on which floor of the building (the user of) the display apparatus is present, and at which position on said floor in the building (the user of) the display apparatus is present. Thus, in such a case, the global coordinate system may be used to determine the location of the display apparatus.

In another embodiment, the at least one processor is configured to determine the location of the display apparatus in a geographic coordinate system. The geographic coordinate system is used to represent geographic positions on the Earth. Optionally, the geographic coordinate system defines the location of the display apparatus using latitude and longitude coordinates, and additionally, optionally, using elevation coordinates. The geographic coordinate system is well-known in the art. In an example, the location of the display apparatus may be determined as 40.7128 degrees North and 74.0060 degrees West.

A given software application is a location-based XR experience application which when executed, creates and overlays location-based virtual content on the at least one image representing the real-world environment to present the XR environment (with which the user of the display apparatus may interact). Optionally, the at least one software application provides at least one of: an XR advertisement, an XR infotainment, a XR navigation, an XR entertainment, an XR notification, an XR information.

In an example, when the display apparatus is located at or in a vicinity of a restaurant, the at least one software application that upon execution, may provide a virtual menu of the restaurant. In another example, when the display apparatus is located at an apparel shop, the at least one software application, upon execution, may provide a virtual advertisement of on-going offers at the apparel shop. In yet another example, when the display apparatus is located at a theatre, the at least one software application, upon execution, may provide to a virtual notification of up-coming movie(s) or show(s) in the theatre. In still another example, the user of the display apparatus may be present inside a shopping mall comprising multiple floors. In such a case, software application(s) available for one floor of the shopping mall may be different from software application(s) available for another floor of the shopping mall, even when a geographical location of the display apparatus is same for both the floors of the shopping mall.

In some implementations, the location of the display apparatus is a current location of the display apparatus, wherein the current location is a present location of the user in the real-world environment. In other implementations, the location of the display apparatus is a predicted location of the display apparatus, wherein the predicted location is a location within the real-world environment where the user is predicted to be in future (i.e., where the user is soon-to-be). Beneficially, predicting the location of the display apparatus facilitates in executing the at least one software application in real-time or near real-time with minimal latency. It will be appreciated that as the location of the display apparatus changes (for example, when the user moves around the real-world environment), at least one software application available for the current location of the display apparatus is executed (namely, activated) in real-time, while execution of previously-executed software application(s) available for previous location(s) of the display apparatus is ceased. Optionally, the at least one software application is preloaded in the data repository communicably coupled to the at least one processor, is cached in the data repository, is on-demand downloaded from the data repository, or is received via broadcast by the data repository.

Optionally, locations in the real-world environment are organized according to a governance hierarchy. Optionally, an experience governing module executing on the server allocates the at least one software application to at least one location in the real-world environment. Upon such allocation, the at least one software application becomes available for the at least one location. It will be appreciated that the at least one software application allocated to the at least one location may be enabled for private access or public access. As an example, the at least one software application may be accessible to users inside an intranet for data security purposes. In this regard, only those software applications that the user is authorized to access, are obtained by the at least one processor. The access information pertaining to the at least one software application serves as an experience pointer, and is obtained from the experience governing module executing on the server, via location-based software application governing software service(s) and/or interface. The experience governing module may implement a location-based software application governing backend running on the server, via the location-based software application governing software service(s) and/or interface. The server may implement backend servers pre-launch runtimes for providing small lag times for their corresponding software applications.

Optionally, the governance hierarchy comprises multiple levels according to which the locations in the real-world environment are organized. As an example, the governance hierarchy may have nine levels in a top to bottom order that is: a root level, a country level, a city level, a block level, a street level, a building level, a floor level, a room level, and a region/area level. In an example, when the locations are organized at the city level, the experience governing module may allocate 100, 200, 350 software applications to cities A, B, and C, respectively. In another example, when the locations in a building are organized at the floor level, the experience governing module may allocate 10, 5, 15 software applications to a ground floor, a first floor, a second floor of the building, respectively. Optionally, the governance hierarchy is stored at a data repository, wherein the data repository is communicably coupled to the server and/or the at least one processor. Such a data repository may be implemented as a memory of a device (such as the display apparatus, a network device), a removable memory, a cloud-based database, or similar.

Optionally, when obtaining the at least one software application, the at least one processor is configured to:
 send information indicative of the location of the display apparatus to a server;
 receive, from the server, access information pertaining to the at least one software application, based on the location of the display apparatus, wherein the access information is provided to enable accessing the at least one software application from a computer network; and
 access, using the access information, the at least one software application along with the metainformation.

Optionally, the information indicative of the location of the display apparatus comprises location coordinates of the display apparatus in the real-world environment. Optionally, the at least one processor is communicably coupled to the server. It will be appreciated that multiple servers can be employed (i.e., mirrored), to increase a capacity of location-based XR experiences that can be provided to the user and to have close proximity to the user. In an example, the location-based XR experience is similar to a website, such as a Hypertext Mark-up Language 5 (HTML5) code comprising some executable elements.

Optionally, the access information comprises a Uniform Resource Locator (URL) that specifies a location on the computer network from where the at least one software application corresponding to the location of the display apparatus is accessed. Once the at least one processor receives the URL, the at least one processor is configured to automatically download the at least one software application (along with the metainformation) for subsequent execution from the aforesaid location on the computer network. The computer network could be the Internet, an intranet, a local area network (LAN), a wireless local area network (WLAN), and the like.

Optionally, the display apparatus further comprises second tracking means, wherein the at least one processor is configured to:
process second tracking data, collected by the second tracking means, to determine an orientation of the display apparatus in the real-world environment; and
send information indicative of the orientation of the display apparatus to the server, wherein the at least one software application is available for the location of the display apparatus specific to the orientation of the display apparatus.

In some implementations, the second tracking means is the same as the first tracking means. In such implementations, the first tracking means (implemented as, for example, at least one of: an inside-out tracking system, an outside-in tracking system) is employed for determining the location of the display apparatus as well as for determining the orientation of the display apparatus. In such a case, the first tracking means is implemented as a true six Degrees of Freedom (6DoF) tracking system to facilitate a 3D tracking of position and orientation of the display apparatus. In other implementations, the second tracking means is different from the first tracking means. In such implementations, the first tracking means (implemented as, for example, a GPS tracking system) is only employed for determining the location of the display apparatus, whereas the second tracking means (implemented as, for example, at least one of: an inside-out tracking system, an outside-in tracking system) is employed for determining the orientation of the display apparatus.

Optionally, the information indicative of the orientation of the display apparatus comprises Euler angles (in particular, roll, pitch and yaw angles) depicting the orientation of the display apparatus in the real-world environment. For a given location of the display apparatus, the display apparatus could have different orientations, and thus the user could perceive different views of the real-world environment corresponding to different fields of view of the display apparatus that correspond to the different orientations. The fields of view of the display apparatus may represent different perspectives of the real-world environment from the given location of the display apparatus, and these different perspectives can represent different locations with which different software applications may be associated. Therefore, optionally, the at least one processor is configured to: receive, from the server, the access information pertaining to the at least one software application, based also on the orientation of the display apparatus; and access, using the access information, the at least one software application along with the metainformation. Thus, the at least one processor receives the access information for only those software application(s) that is/are available for the location of the display apparatus specific to the orientation of the display apparatus.

In an example, the real-world environment may be a shopping centre (such as a mall) and the user of the display apparatus may be present at a location of a coffee shop in the shopping centre. At a time instant T1, the display apparatus may be oriented towards an interior of the coffee shop. In such a case, the at least one software application that is accessed by the at least one processor may, when executed, create and overlay virtual content relevant to the interior of the coffee shop on the at least one image. Such virtual content may, for example, be a virtual menu of the coffee shop, a virtual theme song of the coffee shop, or similar. At a time instant T2, the display apparatus may be oriented towards an exterior of the coffee shop. In such a case, the at least one software application that is accessed by the at least one processor may, when executed, create and overlay virtual content relevant to the exterior of the coffee shop on the at least one image. Such virtual content may, for example, be a virtual directory of the shopping centre, a virtual advertisement of ongoing sales in the shopping centre, or similar.

Notably, the metainformation enables overlaying accurately the virtual content at the location with which the at least one software application is associated. The metainformation is optionally stored in the data repository. It will be appreciated that a single software application may be associated with multiple locations in the real-world environment. In an example, a software application for providing a virtual menu of a restaurant chain may be associated with five locations in the real-world environment where outlets of the same restaurant chain are present. It will also be appreciated that multiple software applications may be associated with a single location in the real-world environment. In an example, a first software application for providing a virtual notification of offers in a toy store, a second software application for providing a virtual advertisement of a toy train, and a third software application for providing a virtual mall directory are all associated with the single location (such as a location right outside the toy store) in the real-world environment.

Optionally, the metainformation is further indicative of a shape of a three-dimensional bounding volume inside which the virtual content is to be created, wherein, when executing the at least one software application, the at least one processor is configured to create the virtual content according to the shape of the three-dimensional bounding volume. The term "bounding volume" refers to a closed volume in the 3D space of the real-world environment that completely surrounds the virtual object. The virtual content is created (namely, generated) within the 3D bounding volume. The 3D bounding volume could be an axis-aligned bounding box (AABB) volume, an oriented bounding box (OBB) volume, a discrete oriented polytope (DOP) volume, or similar. The bounding volume is well-known in the art. The shape of the 3D bounding volume could be cuboidal, cubical, pyramidal, cylindrical, spherical, conical, ellipsoidal, polygonal prism, irregular, freeform, or similar. When the shape of the 3D bounding volume is known, the virtual content can be accurately created (and positioned) in the real-world environment. This is so because the shape of the 3D bounding volume serves a frame of reference for creation of the virtual content.

Optionally, the at least one processor is configured to create the virtual content upon a surface of the shape of the 3D bounding volume. In an example, when the shape of the 3D bounding volume is cylindrical, a virtual menu of a cafeteria may be created in a manner the virtual menu wraps around a cylindrical surface of the 3D bounding volume. Optionally, the at least one processor is configured to create the virtual content inside the shape of the 3D bounding volume. In an example, when the shape of the 3D bounding volume is cuboidal, a virtual mascot of a video game store may be created in a manner the virtual mascot lies within the cuboidal shape of the 3D bounding volume.

Throughout the present disclosure, the term "virtual content" refers to a computer-generated content (namely, a digital content). Optionally, the virtual content comprises at least one virtual object. Examples of the at least one virtual object may include, but are not limited to, a virtual navigation tool (such as a virtual map, a virtual direction signage, and so forth), a virtual gadget (such as a virtual calculator, a virtual computer, and so forth), a virtual message (such as a virtual instant message, a virtual to-do note, and so forth), a virtual entity (such as a virtual person, a virtual mascot, a virtual animal, a virtual ghost, and so forth), a virtual logo of a company, a virtual entertainment media (such as a virtual painting, a virtual video, a virtual advertisement, and so forth), a virtual vehicle or part thereof (such as a virtual car, a virtual cockpit, and so forth), and a virtual information (such as a virtual notification, a virtual news description, a virtual announcement, virtual data, and so forth).

Optionally, the metainformation is further indicative of a size of a three-dimensional bounding volume inside which the virtual content is to be created, wherein, when executing the at least one software application, the at least one processor is configured to create the virtual content according to the size of the three-dimensional bounding volume. Optionally, in this regard, the at least one processor is configured to size the virtual content to fit within the 3D bounding volume. It will be appreciated that optionally a size of the virtual content is less than or equal to the 3D bounding volume. When the size of the 3D bounding volume is known, the virtual content can be accurately created (and positioned) in the real-world environment. This is so because the size of the 3D bounding volume serves a frame of reference for creation of the virtual content.

In an embodiment, prior to obtaining the at least one software application, the at least one processor is configured to select the at least one software application from a set of software applications that are available for the location of the display apparatus, based on at least one of: a user's preference of a type of the virtual content to be shown, a time of a day, a season, a size of a three-dimensional bounding volume inside which the virtual content is to be created. In this regard, even though all the software applications of the set can be obtained, the at least one processor selects (i.e., filters) specific software application(s) that are to be obtained from amongst the set of software applications based on at least one aforementioned criterion, and only those specific software application(s) is/are obtained and subsequently executed. Beneficially, such a manner of selectively obtaining the software applications minimizes communication bandwidth issues and reduces time required to obtain requisite software application(s) since all the software applications of the set may not be obtained. Thus, the requisite software application(s) can be obtained at a high data transmission rate.

Optionally, the user provides an input that is indicative of the user's preference of the type of the virtual content to be shown, and the at least one processor accordingly selects only those software applications that match with the user's preference. Thus, undesirable location-based XR experiences could be skipped or filtered out by not selecting their corresponding software applications. The user's preference could be related to a specific type of a product (such as clothes, appliances, footwear, and the like), a gender (such as male or female), an age-group (such as kids, adults, or similar), a price range, a cuisine (such as an Italian cuisine, an Indian cuisine, a Chinese cuisine, and the like), a restaurant chain, and the like. Furthermore, some software applications (for example, a virtual entertainment application associated with a specific location of the real-world environment) may need to be subscribed or purchased by the user. In this regard, the input provided by the user may be that of subscribing or of making a payment.

Optionally, the at least one processor is configured to select the at least one software application according to the time of the day. In an example, when the time of the day is morning (such as a time between 6 AM to 10 AM), the at least one processor selects the at least one software application that upon execution, may provide a virtual notification of restaurants serving breakfasts. In another example, when the time of the day is afternoon (such as a time between 12 PM to 2 PM), the at least one processor selects the at least one software application that upon execution may provide a virtual advertisement of ongoing offers for lunch.

Optionally, the at least one processor is configured to select the at least one software application according to the (current) season. Such a season could be a climate-based season, a festive season, and the like. In an example, during a winter season (such as from December to February), the at least one processor selects the at least one software application that, upon execution, may provide a virtual notification of ongoing sales on winter clothes in a mall. In another example, during a festive season (such as Christmas, Thanksgiving and the like), the at least one processor selects the at least one software application that upon execution may provide a virtual advertisement of ongoing sales on appliances and crockery in a shopping centre. Optionally, when the at least one processor is configured to select the at least one software application based on the size of the 3D bounding volume, software application(s) that is/are too big to be experienced in the 3D bounding volume are not considered for the selection.

In another embodiment, the at least one software application is directly provided to the at least one processor by a server, and the server is configured to select the at least one software application from a set of software applications that are available for the location of the display apparatus, based on at least one of: a service providers preference of a type of the virtual content to be shown, a user's preference of a type of the virtual content to be shown, a time of a day, a season, a size of a 3D bounding volume inside which the virtual content is to be created. In this regard, even though all the software applications of the set can be provided to the at least one processor, the server selects (i.e., filters) specific software application(s) that are to be provided from amongst the set of software applications based on at least one aforementioned criterion, and only those specific software application(s) is/are provided to the at least one processor. Some types of virtual content may be restricted by some service providers for some locations of the real-world environment, and thus when the server performs the aforesaid selection based on a service provider's preference, software applications corresponding to said types of virtual content would not be selected by the server. In an example, the user of the display apparatus may be a kid whose age is below 10 years. In such a case, a service provider may restrict a violent virtual content from being shown to the kid.

The relative location is determined to ascertain a distance from which the user of the display apparatus views the location with which the at least one software application is associated, and how the user would see the (requisite) virtual content when the at least one software application is executed. The relative location is indicative of an offset in locations of (the user of) the display apparatus and the location with which the at least one software application is associated.

In this regard, the creation and overlaying of the virtual content is performed in a manner that the virtual content appears realistic and is positioned correctly with respect to the location of the user (by way of utilizing the relative location). Optionally, when creating the virtual content, the at least one processor is configured to determine a size of the virtual content according to the relative location. Greater the relative distance, smaller is the size of the virtual content, and vice versa. Optionally, when executing the at least one software application to create and overlay the virtual content on the at least one image, the at least one processor is configured to generate the virtual content corresponding to the at least one software application and to digitally superimpose the virtual content on the at least one image.

It will be appreciated that prior to overlaying the virtual content on the at least one image, the at least one image could be one of: a video see-through (VST) image, an augmented-reality (AR) image, a mixed-reality (MR) image. The at least one image gets digitally modified when the virtual content is overlaid thereupon. Therefore, after overlaying the virtual content on the at least one image, the at least one image could be one of: an AR image, an MR image. Optionally, the display apparatus comprises at least one camera, wherein the at least one camera is controlled, by the at least one processor, to capture the VST image, wherein the VST image represents a real-world scene of the real-world environment. Such a real-world scene presents a view of the real-world environment from a perspective of the user of the display apparatus. Moreover, the real-world scene represents real-world objects that lie in a field of view of the user. Examples of the at least one camera include, but are not limited to, a Red-Green-Blue (RGB) camera, a Red-Green-Blue-Alpha (RGB-A) camera, and a monochrome camera.

Optionally, the at least one processor is configured to:
detect a change in a distance between the location of the display apparatus and the location with which the at least one software application is associated; and
adjust a data quality of the virtual content, based on the change in the distance.

In this regard, the data quality of the virtual content encompasses at least one of: a texture quality, a resolution quality, a mesh quality of the virtual content. Such a data quality is optionally provided by the at least one software application, and is adjusted according to the change in the distance. Optionally, the data quality of the virtual content is a 3D data quality.

In one case, the distance between the location of the display apparatus and the location with which the at least one software application is associated reduces when the user of the display apparatus comes closer to the location with which the at least one software application is associated. In such a case, the data quality of the virtual content is adjusted in a manner that the data quality of the virtual content increases, and an amount of data required to create the virtual content is considerably high. Thus, the virtual content would appear for example, information-rich, high quality, and more realistic as compared to earlier. In another case, the distance between the location of the display apparatus and the location with which the at least one software application is associated increases when the user of the display apparatus moves farther from the location with which the at least one software application is associated. In such a case, the data quality of the virtual content is adjusted in a manner that the data quality of the virtual content decreases, and an amount of data required to create the virtual content is considerably low. Thus, the virtual content would have for example, less information, a low resolution as compared to earlier. In both the aforesaid cases, the at least one processor is configured to overlay modified virtual content (that is created upon adjusting the data quality of the virtual content) on subsequent images.

In an example, when an original distance between the location of the display apparatus and the location with which the at least one software application is associated is, for example, 3 metres, a resolution of the virtual content may be high. When the original distance increases to, for example, 10 metres, the resolution of the virtual content may be low.

Notably, after overlaying the virtual object on the at least one image, the at least one image is subsequently displayed using the at least one light source, in real time or near-real time (i.e., without any latency). As a result, a realistic and immersive location-based XR experience is provided to the user of the display apparatus, which may improve a usage-experience of display apparatus for the user.

Optionally, the at least one processor is configured to:
detect when a distance between the location of the display apparatus and the location with which the at least one software application is associated exceeds a predefined threshold distance; and
when it is detected that the distance exceeds the predefined threshold distance, cease the execution of the at least one software application.

The term "predefined threshold distance" refers to a maximum distance (between the location of the display apparatus and the location with which the software application is associated) at which the at least one software application is to be executed. When the distance exceeds the predefined threshold distance, execution of the at least one software application is ceased, i.e., an operation of creating and overlaying the virtual content on subsequent images is stopped, and vice versa. Ceasing the execution of the at least one software application is beneficial when the user of the display apparatus has moved too far from the location with which the software application is associated, since then the virtual content created by the at least one software application is less likely to be relevant for the user. In such a case, the at least one processor can efficiently utilize a communication bandwidth for providing requisite and relevant location-based XR experience(s) to the user. Moreover, a location-based XR experience inside a 3D bounding volume corresponding to the at least one software application may be unavailable to the user till the distance between the location of the display apparatus and the location with which the at least one software application is associated is greater than the predefined threshold distance.

Optionally, the predefined threshold distance depends on a type of a given software application and/or a type of a real-world setting in which the given software application is employed. Such a real-world setting may be an indoor real-world setting or an outdoor real-world setting. In an example, when the user is inside a shopping mall, the predefined threshold distance may lie in a range of 5 meters to 50 meters. In another example, when the user is cycling or is driving on a road, the predefined threshold distance may lie in a range of 1 kilometres to 20 kilometres. The predefined threshold distance may be either user-defined or system-defined by default.

Optionally, the at least one software application comprises a plurality of software applications, and wherein, when executing the plurality of software applications, the at least one processor is configured to:

determine corresponding distances between the location of the display apparatus and corresponding locations with which the plurality of software applications are associated; and arrange virtual contents at corresponding positions in a 3D space represented in the at least one image, created upon execution of the plurality of software applications, based on a comparison between the corresponding distances when overlaying the virtual contents on the at least one image.

In this regard, when the plurality of software applications are to be executed, the virtual contents corresponding to the plurality of software applications are arranged at the corresponding positions in the 3D space, wherein a given position at which a given virtual content is to be arranged depends on a distance between a given location of the display apparatus and a corresponding location with which a given software application is associated. Such arranging is beneficially performed by the aforementioned compositor. It will be appreciated that when comparing the corresponding distances to arrange the virtual contents at the corresponding positions in the 3D space, a virtual content corresponding to a smallest distance is arranged at a front-most position (namely, a position nearest to the user), a virtual content corresponding to a next smallest distance is arranged at a position behind the front-most position, and so on until a virtual content corresponding to a farthest distance is arranged at a back-most position (namely, a position farthest from the user). Beneficially, arranging the virtual contents at the corresponding positions in the aforesaid manner provides an accurate inter-arrangement of the virtual contents. Moreover, the virtual contents (created and overlaid upon execution of software application(s)) appear realistic and are positioned accurately with respect to the location of the user. Thus, a realistic and immersive location-based XR experience is provided to the user, which may improve a usage-experience of display apparatus for the user.

In a first example, a fourth software application for providing a virtual menu of an eatery may be associated with a first location, and a fifth software application for providing a virtual advertisement of ongoing offers in an eatery may be associated with a second location. Herein, the location of the display apparatus is closer to the second location as compared to the first location. In such case, when overlaying virtual contents on the at least one image, the virtual menu and the virtual advertisement may be arranged at a first position and a second position, respectively, wherein the second position is nearer to the location of the display apparatus as compared to the first position.

Optionally, when executing the plurality of software applications, the at least one processor is configured to perform at least one of: re-sizing, moving, rotating of at least one of the virtual contents, based on a comparison between the corresponding distances, prior to overlaying the virtual contents on the at least one image. Optionally, when performing the at least one of: re-sizing, moving, rotating of at least one of the virtual contents, the at least one processor is configured to employ at least one image processing algorithm.

It will be appreciated that the re-sizing of the virtual contents enables in correctly representing sizes of the virtual contents with respect to the corresponding distances. Moreover, moving a virtual content means that the virtual content is repositioned from one position in the 3D space (represented in the at least one image) to another position in the 3D space. Said repositioning is accurately performed by the at least one processor with respect to a corresponding distance that is required between the location of the display apparatus and a location of the virtual content in an XR environment. The virtual contents are moved in a manner that collisions between the virtual contents are prevented (i.e., virtual contents provided by software applications at different distances from the display apparatus would not appear to be at a same distance in the at least one image). Furthermore, rotation of the virtual contents is performed to correct orientation of the virtual content (prior to overlaying it on the at least one image) in a manner that the virtual object is accurately visible to the user from a given perspective.

Continuing from the aforementioned first example, since the location of the display apparatus is closer to the second location as compared to the first location, the virtual menu may be re-sized to be made smaller in size as compared the virtual advertisement. As a result, a realistic and immersive location-based XR experience is provided to the user of the display apparatus, as typically objects that are located farther from a user's eye appear smaller in size as compared to when they are nearer.

Optionally, the display apparatus further comprises second tracking means, wherein the at least one processor is configured to:

process second tracking data, collected by the second tracking means, to determine an orientation of the display apparatus in the real-world environment; and determine a relative orientation of the display apparatus with respect to the location with which the at least one software application is associated, wherein, when executing the at least one software application, the at least one processor is configured to:

determine a portion of the at least one image on which the virtual content is to be overlaid, based on the relative orientation of the display apparatus with respect to the location with which the at least one software application is associated; and overlay the virtual content on the determined portion of the at least one image.

The relative orientation of the display apparatus is indicative of a perspective (i.e., a field of view) with which the user of the display apparatus views the location with which the at least one software application is associated. Depending on the relative orientation with respect of the location of the at least one software application, the position of overlaying the virtual content on the at least one image is determined. As an example, the relative orientation may be such that the location of the at least one software application lies straight in front of the user. In such a case, a portion of the at least one image on which the virtual content is to be overlaid may be a central portion of the at least one image. As another example, the relative orientation may be such that the location of the at least one software application lies on a right side of the user. In such a case, a portion of the at least one image on which the virtual content is to be overlaid may be a right side portion of the at least one image. Beneficially, the at least one processor accurately overlays the virtual content on the portion of the at least one image. As a result, a realistic and immersive location-based XR experience is provided to the user of the display apparatus, which may improve a usage-experience of display apparatus for the user.

Optionally, the display apparatus further comprises second tracking means, wherein the virtual content comprises at least one virtual object, and wherein the at least one processor is configured to:

process second tracking data, collected by the second tracking means, to determine an orientation of the display apparatus in the real-world environment; and determine a relative orientation of the display apparatus with respect to the location with which the at least one software application is associated, wherein, when executing the at least one software application, the at least one processor is configured to:

determine a part of the at least one virtual object to be shown in the virtual content, based on the relative orientation of the display apparatus with respect to the location with which the at least one software application is associated; and create the virtual content to show the determined part of the at least one virtual object.

It will be appreciated that the relative orientation is indicative of a perspective (namely, an angle) from which the user of the display apparatus would view the at least one virtual object and how the at least one virtual object (when arranged at the location) would appear to the user from such a perspective. Therefore, a perspective view of the at least one virtual object on the at least one image would be different for different relative orientations. In this regard, the at least one processor determines the part of the at least one virtual object to be shown according to the perspective with which the user of the display apparatus views the location, and how the at least one virtual object would appear to the user if it were arranged at the location. The part of the at least one virtual object to be shown is what would be visible to the user; a remaining part of the at least one virtual object would not be visible and need not be shown. Beneficially, the at least one processor accurately create a (requisite) perspective view of the part of the virtual content accordingly. As a result, a realistic and immersive location-based XR experience is provided to the user of the display apparatus. Optionally, the at least one processor is configured to overlay the virtual content depicting the determined part of the at least one virtual object, on the at least one image.

As an example, a given virtual object may be a virtual mascot of a toy store, and the user of the display apparatus can view a part or an entirety of the virtual mascot from a left side, a right side, a front side, a back side, a top side, or a bottom side or from any other side/angle. The relative orientation of the display apparatus with respect to a location with which a given software application for providing the virtual mascot is associated may be such that the left side and the front side of the virtual mascot would be visible to the user. In such a case, a left part and a front part of the virtual mascot would be created and overlaid on the at least one image, while other parts (such as a top part, a right side part, and the like) of the virtual mascot would not be created.

The present disclosure also relates to the method as described above. Various embodiments and variants disclosed above apply mutatis mutandis to the method.

Optionally, in the method, the metainformation is further indicative of a shape of a three-dimensional bounding volume inside which the virtual content is to be created, wherein the virtual content is created according to the shape of the three-dimensional bounding volume.

Optionally, in the method, the metainformation is further indicative of a size of a three-dimensional bounding volume inside which the virtual content is to be created, wherein the virtual content is created according to the size of the three-dimensional bounding volume.

Optionally, the method further comprises:

detecting a change in a distance between the location of the display apparatus and the location with which the at least one software application is associated; and adjusting a data quality of the virtual content, based on the change in the distance.

Optionally, the method further comprises:

detecting when a distance between the location of the display apparatus and the location with which the at least one software application is associated exceeds a predefined threshold distance; and when it is detected that the distance exceeds the predefined threshold distance, ceasing the execution of the at least one software application.

Optionally, the method further comprises:

processing second tracking data, collected by second tracking means, to determine an orientation of the display apparatus in the real-world environment; and determining a relative orientation of the display apparatus with respect to the location with which the at least one software application is associated;

wherein the step of executing the at least one software application comprises:

determining a portion of the at least one image on which the virtual content is to be overlaid, based on the relative orientation of the display apparatus with respect to the location with which the at least one software application is associated; and overlaying the virtual content on the determined portion of the at least one image.

Optionally, the virtual content comprises at least one virtual object, and wherein the method further comprises:

processing second tracking data, collected by second tracking means, to determine an orientation of the display apparatus in the real-world environment; and determining a relative orientation of the display apparatus with respect to the location with which the at least one software application is associated, wherein the step of executing the at least one software application comprises:

determining a part of the at least one virtual object to be shown in the virtual content, based on the relative orientation of the display apparatus with respect to the location with which the at least one software application is associated; and creating the virtual content to show the determined part of the at least one virtual object.

Optionally, in the method, the step of obtaining the at least one software application comprises:

sending information indicative of the location of the display apparatus to a server;

receiving, from the server, access information pertaining to the at least one software application, based on the location of the display apparatus, wherein the access information is provided to enable accessing the at least one software application from a computer network; and accessing, using the access information, the at least one software application along with the metainformation.

Optionally, the method further comprises:

processing second tracking data, collected by second tracking means, to determine an orientation of the display apparatus in the real-world environment; and sending information indicative of the orientation of the display apparatus to the server, wherein the at least one software application is available for the location of the display apparatus specific to the orientation of the display apparatus.

Optionally, the method further comprises selecting the at least one software application from a set of software applications that are available for the location of the display apparatus, based on at least one of: a user's preference of a type of the virtual content to be shown, a time of a day, a season, a size of a three-dimensional bounding volume inside which the virtual content is to be created, prior to the step of obtaining the at least one software application.

Optionally, in the method, the at least one software application comprises a plurality of software applications, and wherein the step of executing the plurality of software applications comprises:
- determining corresponding distances between the location of the display apparatus and corresponding locations with which the plurality of software applications are associated; and
- arranging virtual contents at corresponding positions in a 3D space represented in the at least one image, created upon execution of the plurality of software applications, based on a comparison between the corresponding distances when overlaying the virtual contents on the at least one image.

Optionally, in the method, the step of executing the plurality of software applications further comprises performing at least one of: re-sizing, moving, rotating of at least one of the virtual contents, based on a comparison between the corresponding distances, prior to overlaying the virtual contents on the at least one image.

DETAILED DESCRIPTION OF THE DRAWINGS

Figure 1:
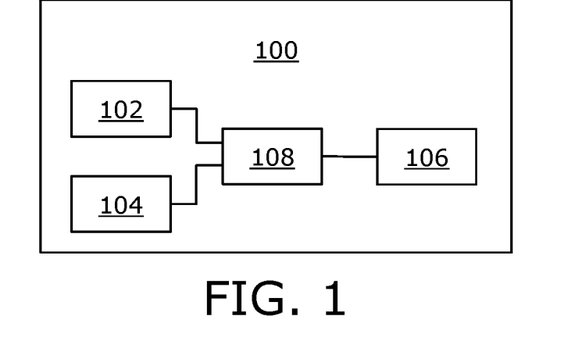
FIGS. 1 and 2 illustrate block diagrams of architectures of a display apparatus, in accordance with different embodiments of the present disclosure.

Referring to FIG. 1, illustrated is a block diagram of architecture of a display apparatus 100, in accordance with an embodiment of the present disclosure. The display apparatus 100 comprises at least one light source per eye (depicted as a light source 102 for a left eye and a light source 104 for a right eye), first tracking means 106, and at least one processor (depicted as a processor 108). The processor 108 is coupled to the light sources 102 and 104, and to the first tracking means 106.

Figure 2:
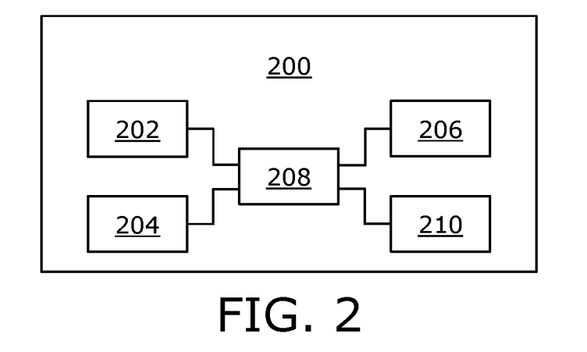

Referring to FIG. 2, illustrated is a block diagram of architecture of a display apparatus 200, in accordance with another embodiment of the present disclosure. The display apparatus 200 comprises at least one light source per eye (depicted as a light source 202 for a left eye and a light source 204 for a right eye), first tracking means 206, at least one processor (depicted as a processor 208), and second tracking means 210. The processor 208 is coupled to the light sources 202 and 204, the first tracking means 206, and the second tracking means 210.

It may be understood by a person skilled in the art that the FIGS. 1 and 2 include simplified architectures of the display apparatuses 100 and 200, respectively, for sake of clarity, which should not unduly limit the scope of the claims herein. The person skilled in the art will recognize many variations, alternatives, and modifications of embodiments of the present disclosure.

Figure 3:
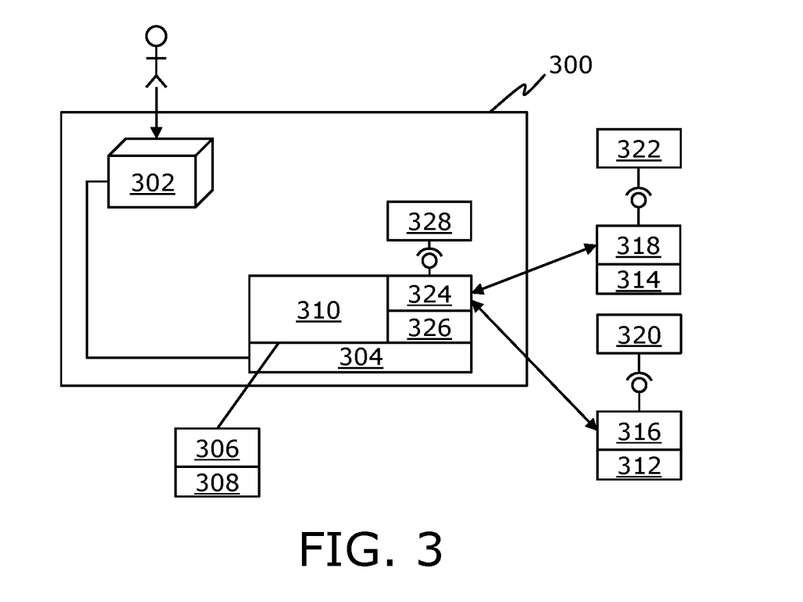
FIG. 3 is an exemplary schematic usage scenario of a display apparatus, in accordance with an embodiment of the present disclosure.

Referring to FIG. 3, illustrated is an exemplary schematic usage scenario of a display apparatus 300, in accordance with an embodiment of the present disclosure. The display apparatus 300 is implemented, for example, as a head-mounted device 302. At least one light source (not shown) is arranged in the head-mounted device 302. First tracking means 304 collects first tracking data indicative of a location of the display apparatus 300 in a real-world environment. At least one processor (not shown) of the display apparatus 300 obtains at least one software application that is available for the location of the display apparatus. The at least one software application is obtained from a location-based software application governing backend 306 running on a server 308, via a location-based software application governing software service and/or interface 310. In some optional instances, backend servers 312 and 314 pre-launch runtimes 316 and 318 for providing small lag times for their corresponding software applications 320 and 322, respectively. An experience managing module 324 and compositor 326 of the at least one processor serve as a runtime layer of the display apparatus 300. The at least one software application is executed to create and overlay virtual content on at least one image representing the real-world environment, thereby producing an augmented reality or a mixed reality environment 328.

It may be understood by a person skilled in the art that the FIG. 3 is merely an example for sake of clarity, which should not unduly limit the scope of the claims herein. The person skilled in the art will recognize many variations, alternatives, and modifications of embodiments of the present disclosure.

Figure 4A:
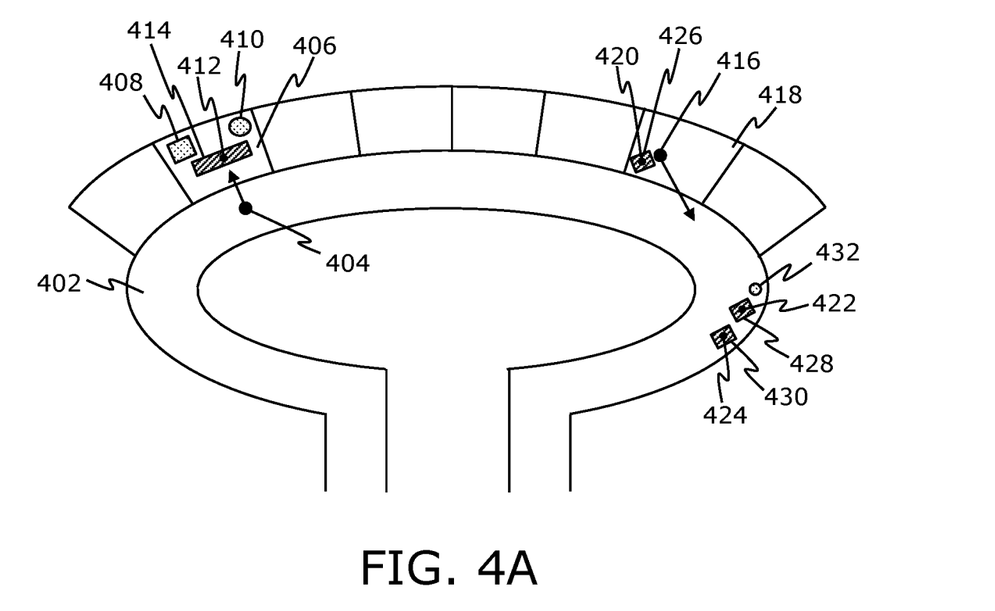

Referring to FIG. 4A, illustrated is a plan view of an exemplary real-world environment 400 in which a display apparatus (not shown) is used, in accordance with an embodiment of the present disclosure. The real-world environment 400 is, for example, a shopping centre (such as a mall). The real-world environment 400 is shown, for example, to comprise a path 402 and eight shops along the path 402. Let us consider that at time t1, a user of the display apparatus is at a location 404 on the path 402 in a manner that the display apparatus is oriented (depicted by a small arrow) towards an interior of a shop 406, wherein the shop 406 includes real objects 408 and 410. A software application that is available for the location 404 is obtained along with metainformation indicative of a location 412 in the real-world environment 400 with which the software application is associated. A relative location of the display apparatus with respect to the location 412 is determined. The software application is executed to create and overlay virtual content (depicted as a virtual object 414) on at least one image representing the real-world environment 400, based on the relative location. Finally, the at least one image (which now represents the real objects 408 and 410 and the virtual object 414) is displayed at the display apparatus.

Next, let us consider that at time t2, the user of the display apparatus is at a location 416 in a manner that the display apparatus is oriented (depicted by a long arrow) towards an exterior of a shop 418. In such a case, three software applications that are available for the location 416 are obtained along with metainformation indicative of locations 420, 422, and 424 in the real-world environment 400 with which the three software applications are associated. Relative locations of the display apparatus with respect to the locations 420, 422, and 424 are determined. A software application (from amongst the three software applications) which is associated with the location 420, may not be executed to overlay virtual content (depicted as a virtual object 426) on at least one image representing the real-world environment 400, since the location 420 does not lie in a field of view of the display apparatus. However, two software applications (from amongst the three software applications) which are associated with the locations 422 and 424, may be executed to overlay virtual contents (depicted as two virtual objects 428 and 430) on at least one image representing the real-world environment 400, since the location 422 and 424 lie in a field of view of the display apparatus. Finally, the at least one image (which now represents a real object 432 and the two virtual objects 428 and 430) is displayed at the display apparatus.

Figure 4B:
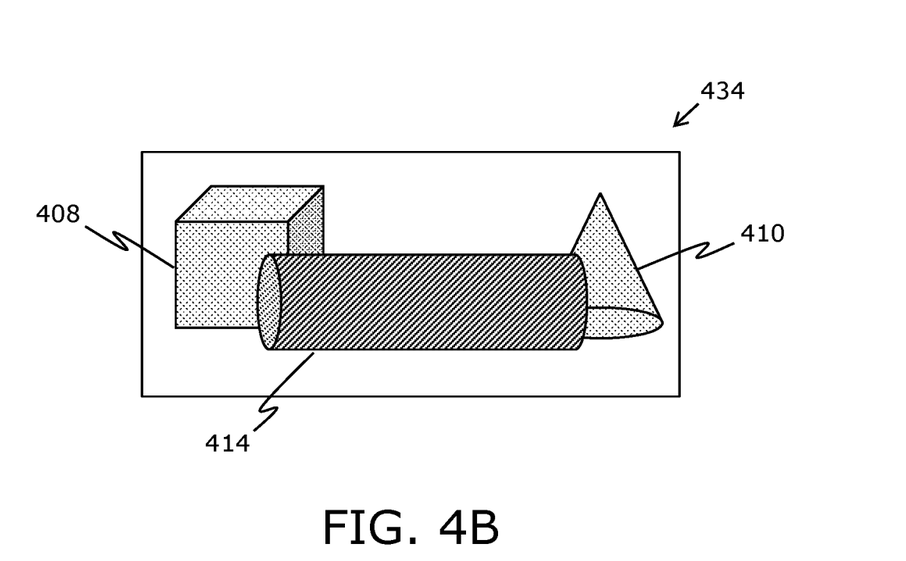
FIG. 4B illustrates an exemplary image to be displayed via the at least one light source of the display apparatus, in accordance with an embodiment of the present disclosure.

Referring to FIG. 4B, illustrated is an exemplary image 434 to be displayed via at least one light source (not shown) of the display apparatus, in accordance with an embodiment of the present disclosure. The image 434 is displayed when the display apparatus is determined to be at the location 404 shown in FIG. 4A. The image 434 represents a portion of the shop 406 and the virtual content (depicted, for example, as the virtual object 414 which is a virtual cylinder). The portion of the shop 406 includes the real object 408 (shown as a cube) and the real object 410 (shown as a cone) on which the virtual object 414 is overlaid.

It may be understood by a person skilled in the art that the FIGS. 4A and 4B are merely examples for sake of clarity, which should not unduly limit the scope of the claims herein. The person skilled in the art will recognize many variations, alternatives, and modifications of embodiments of the present disclosure.

Figure 5:
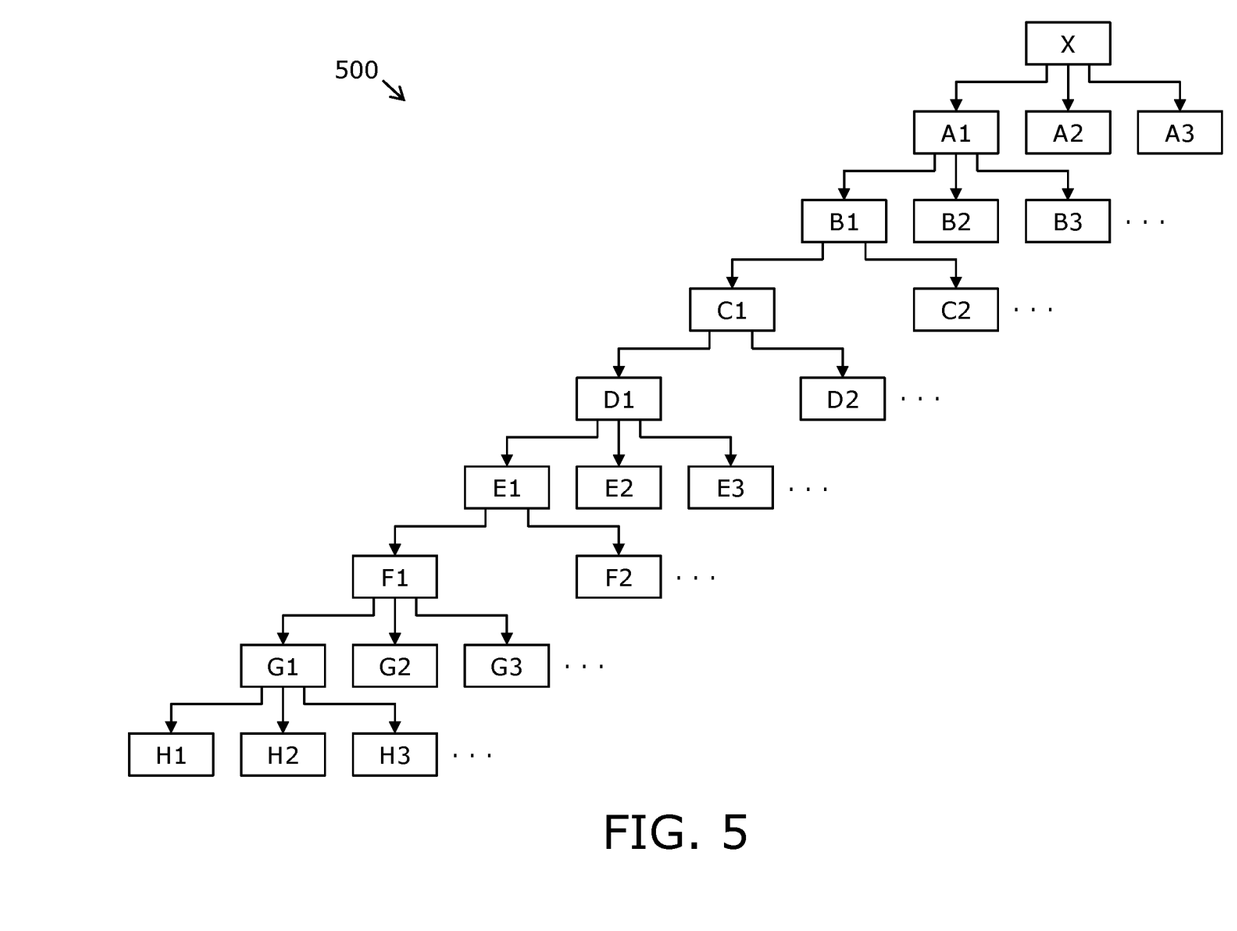
FIG. 5 illustrates various levels of an exemplary governance hierarchy according to which locations in real-world environments can be organized, in accordance with an embodiment of the present disclosure.

Referring to FIG. 5, illustrated are various levels of an exemplary governance hierarchy 500 according to which locations in real-world environments can be organized, in accordance with an embodiment of the present disclosure. The exemplary governance hierarchy 500 is shown to have 9 levels in a top to bottom order that is: a root level (depicted as a root level 'X'), a country level (depicted as countries 'A1', 'A2', 'A3', and so on), a city level (depicted as cities 'B1', 'B2', 'B3', and so on), a block level (depicted as blocks 'C1', 'C2', and so on), a street level (depicted as streets 'D1', 'D2', and so on), a building level (depicted as buildings 'E1', 'E2', 'E3', and so on), a floor level (depicted as floors 'F1', 'F2', and so on), a room level (depicted as rooms 'G1', 'G2', 'G3', and so on), and a region/area level (depicted as regions/areas 'H1', 'H2', 'H3', and so on).

It may be understood by a person skilled in the art that FIG. 5 is merely an example, which should not unduly limit the scope of the claims herein. The person skilled in the art will recognize many variations, alternatives, and modifications of embodiments of the present disclosure. For example, the exemplary governance hierarchy 500 may have different number of levels or different types of levels than the aforesaid level(s).

Figure 6:
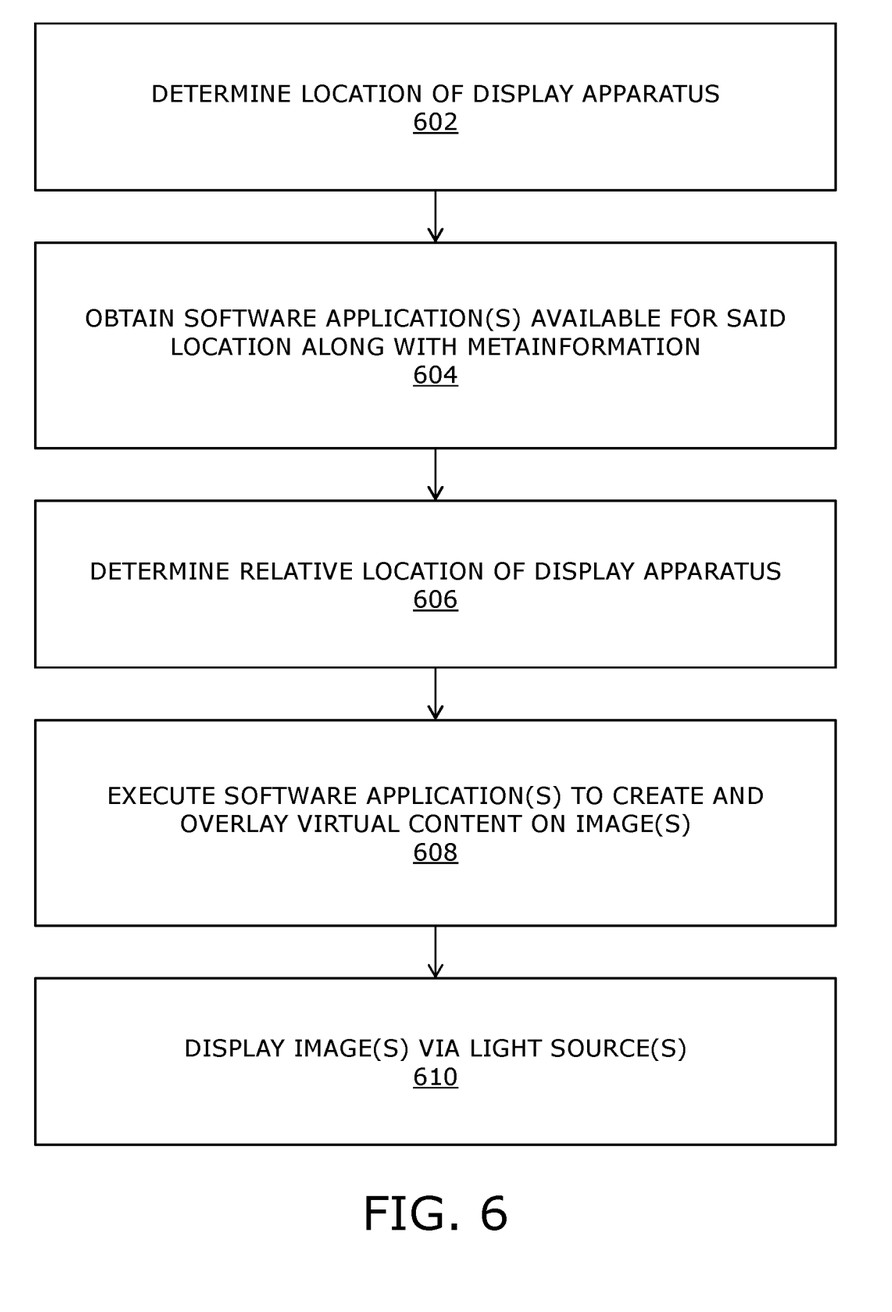
FIG. 6 illustrates steps of a method, in accordance with an embodiment of the present disclosure.

Referring to FIG. 6, illustrated are steps of a method, in accordance with an embodiment of the present disclosure. At step 602, first tracking data, collected by first tracking means, is processed to determine a location of a display apparatus in a real-world environment. At step 604, at least one software application that is available for the location of the display apparatus is obtained along with metainformation indicative of a location in the real-world environment with which the at least one software application is associated. At step 606, a relative location of the display apparatus with respect to the location with which the at least one software application is associated is determined. At step 608, the at least one software application is executed to create and overlay virtual content on at least one image representing the real-world environment, based on the relative location of the display apparatus with respect to the location with which the at least one software application is associated. At step 610, the at least one image is displayed via at least one light source.

The steps 602, 604, 606, 608, and 610 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A display apparatus comprising:
at least one light source per eye;
first tracking means; and
at least one processor configured to:
   process first tracking data, collected by the first tracking means, to determine a location of the display apparatus in a real-world environment;
   obtain at least one software application that is available for the location of the display apparatus in the real world environment along with metainformation indicative of a location in the real-world environment with which the at least one software application is associated;
   determine a relative location of the display apparatus with respect to the location in the real world environment with which the at least one software application is associated;
   execute the at least one software application to create and overlay virtual content on at least one image representing the real-world environment, based on the relative location of the display apparatus with respect to the location in the real world environment with which the at least one software application is associated;
   display the at least one image via the at least one light source;
   detect when a distance between the location of the display apparatus in the real world environment and the location in the real world environment with which the at least one software application is associated exceeds a predefined threshold distance; and
   when the distance between the location of the display apparatus in the real world environment and the location in the real world environment with which the at least one software application is associated exceeds the predefined threshold distance, cease the execution of the at least one software application.

2. The display apparatus of claim 1, wherein the metainformation is further indicative of a shape of a three-dimensional bounding volume inside which the virtual content is to be created, wherein, when executing the at least one software application, the at least one processor is configured to create the virtual content according to the shape of the three-dimensional bounding volume.

3. The display apparatus of claim 1, wherein the metainformation is further indicative of a size of a three-dimensional bounding volume inside which the virtual content is to be created, wherein, when executing the at least one software application, the at least one processor is configured to create the virtual content according to the size of the three-dimensional bounding volume.

4. The display apparatus of claim 1, wherein the at least one processor is configured to:
  detect a change in the distance between the location of the display apparatus in the real world environment and the location in the real world environment with which the at least one software application is associated; and
  adjust a data quality of the virtual content, based on the change in the distance between the location of the display apparatus in the real world environment and the location in the real world environment with which the at least one software application is associated.

5. The display apparatus of claim 1, further comprising second tracking means, wherein the at least one processor is configured to:
  process second tracking data, collected by the second tracking means, to determine an orientation of the display apparatus in the real-world environment; and
  determine a relative orientation of the display apparatus with respect to the location in the real world environment with which the at least one software application is associated,
wherein, when executing the at least one software application, the at least one processor is configured to:
  determine a portion of the at least one image on which the virtual content is to be overlaid, based on the relative orientation of the display apparatus with respect to the location in the real world environment with which the at least one software application is associated; and
  overlay the virtual content on the determined portion of the at least one image.

6. The display apparatus of claim 1, further comprising second tracking means, wherein the virtual content comprises at least one virtual object, and wherein the at least one processor is configured to:
  process second tracking data, collected by the second tracking means, to determine an orientation of the display apparatus in the real-world environment; and
  determine a relative orientation of the display apparatus with respect to the location in the real world environment with which the at least one software application is associated,
wherein, when executing the at least one software application, the at least one processor is configured to:
  determine a part of the at least one virtual object to be shown in the virtual content, based on the relative orientation of the display apparatus with respect to the location in the real world environment with which the at least one software application is associated; and
  create the virtual content to show the determined part of the at least one virtual object.

7. The display apparatus of claim 1, wherein, when obtaining the at least one software application, the at least one processor is configured to:
  send information indicative of the location of the display apparatus in the real world environment to a server;
  receive, from the server, access information pertaining to the at least one software application, based on the location of the display apparatus in the real world environment, wherein the access information is provided to enable accessing the at least one software application from a computer network; and
  access, using the access information, the at least one software application along with the metainformation.

8. The display apparatus of claim 7, further comprising second tracking means, wherein the at least one processor is configured to:
  process second tracking data, collected by the second tracking means, to determine an orientation of the display apparatus in the real-world environment; and
  send information indicative of the orientation of the display apparatus in the real world environment to the server, wherein the at least one software application is available for the location of the display apparatus in the real world environment specific to the orientation of the display apparatus in the real world environment.

9. The display apparatus of claim 1, wherein, prior to obtaining the at least one software application, the at least one processor is configured to select the at least one software application from a set of software applications that are available for the location of the display apparatus in the real world environment, based on at least one of: a user's preference of a type of the virtual content to be shown, a time of a day, a season, a size of a three-dimensional bounding volume inside which the virtual content is to be created.

10. The display apparatus of claim 1, wherein the at least one software application comprises a plurality of software applications, and wherein, when executing the plurality of software applications, the at least one processor is configured to:
  determine corresponding distances between the location of the display apparatus in the real world environment and corresponding locations with which the plurality of software applications are associated; and
  arrange virtual contents at corresponding positions in a 3D space represented in the at least one image, created upon the execution of the plurality of software applications, based on a comparison between the corresponding distances when overlaying the virtual contents on the at least one image.

11. The display apparatus of claim 10, wherein, when executing the plurality of software applications, the at least one processor is configured to perform at least one of: re-sizing, moving, rotating of at least one of the virtual contents, based on the comparison between the corresponding distances, prior to overlaying the virtual contents on the at least one image.

12. A method comprising:
  processing first tracking data, collected by first tracking means, to determine a location of a display apparatus in a real-world environment;
  obtaining at least one software application that is available for the location of the display apparatus in the real world environment along with metainformation indicative of a location in the real-world environment with which the at least one software application is associated;
  determining a relative location of the display apparatus with respect to the location in the real world environment with which the at least one software application is associated;
  executing the at least one software application to create and overlay virtual content on at least one image representing the real-world environment, based on the relative location of the display apparatus with respect to the location in the real world environment with which the at least one software application is associated; and
  displaying the at least one image via at least one light source;
  detecting when a distance between the location of the display apparatus in the real world environment and the location in the real world environment with which the at least one software application is associated exceeds a predefined threshold distance; and when the distance between the location of the display apparatus in the real world environment and the location in the real world environment with which the at least one software application is associated exceeds the predefined threshold distance, ceasing the execution of the at least one software application.

13. The method of claim 12, wherein the metainformation is further indicative of a shape of a three-dimensional bounding volume inside which the virtual content is to be created, wherein the virtual content is created according to the shape of the three-dimensional bounding volume.

14. The method of claim 12, wherein the metainformation is further indicative of a size of a three-dimensional bounding volume inside which the virtual content is to be created, wherein the virtual content is created according to the size of the three-dimensional bounding volume.

15. The method of claim 12, further comprising:
detecting a change in the distance between the location of the display apparatus in the real world environment and the location in the real world environment with which the at least one software application is associated; and
adjusting a data quality of the virtual content, based on the change in the distance between the location of the display apparatus in the real world environment and the location in the real world environment with which the at least one software application is associated.

16. The method of claim 12, further comprising:
processing second tracking data, collected by second tracking means, to determine an orientation of the display apparatus in the real-world environment; and
determining a relative orientation of the display apparatus with respect to the location in the real world environment with which the at least one software application is associated;
wherein the step of executing the at least one software application comprises:
determining a portion of the at least one image on which the virtual content is to be overlaid, based on the relative orientation of the display apparatus with respect to the location in the real world environment with which the at least one software application is associated; and
overlaying the virtual content on the determined portion of the at least one image.

17. The method of claim 12, wherein the virtual content comprises at least one virtual object, and wherein the method further comprises:
processing second tracking data, collected by second tracking means, to determine an orientation of the display apparatus in the real-world environment; and
determining a relative orientation of the display apparatus with respect to the location in the real world environment with which the at least one software application is associated,
wherein the step of executing the at least one software application comprises:
determining a part of the at least one virtual object to be shown in the virtual content, based on the relative orientation of the display apparatus with respect to the location in the real world environment with which the at least one software application is associated; and
creating the virtual content to show the determined part of the at least one virtual object.

18. The method of claim 12, wherein the step of obtaining the at least one software application comprises:
sending information indicative of the location of the display apparatus in the real world environment to a server;
receiving, from the server, access information pertaining to the at least one software application, based on the location of the display apparatus in the real world environment, wherein the access information is provided to enable accessing the at least one software application from a computer network; and
accessing, using the access information, the at least one software application along with the metainformation.

19. The method of claim 18, further comprising:
processing second tracking data, collected by second tracking means, to determine an orientation of the display apparatus in the real-world environment; and
sending information indicative of the orientation of the display apparatus in the real world environment to the server, wherein the at least one software application is available for the location of the display apparatus in the real world environment specific to the orientation of the display apparatus in the real world environment.

20. The method of claim 12, further comprising selecting the at least one software application from a set of software applications that are available for the location of the display apparatus in the real world environment, based on at least one of: a user's preference of a type of the virtual content to be shown, a time of a day, a season, a size of a three-dimensional bounding volume inside which the virtual content is to be created, prior to the step of obtaining the at least one software application.

21. The method of claim 12, wherein the at least one software application comprises a plurality of software applications, and wherein the step of executing the plurality of software applications comprises:
determining corresponding distances between the location of the display apparatus in the real world environment and corresponding locations with which the plurality of software applications are associated; and
arranging virtual contents at corresponding positions in a 3D space represented in the at least one image, created upon the execution of the plurality of software applications, based on a comparison between the corresponding distances when overlaying the virtual contents on the at least one image.

22. The method of claim 21, wherein the step of executing the plurality of software applications further comprises performing at least one of: re-sizing, moving, rotating of at least one of the virtual contents, based on the comparison between the corresponding distances, prior to overlaying the virtual contents on the at least one image.

* * * * *